(No Model.)
E. J. ARMSTRONG.
DEVICE FOR SECURING PISTON RODS TO CROSS HEADS.
No. 521,695. Patented June 19, 1894.
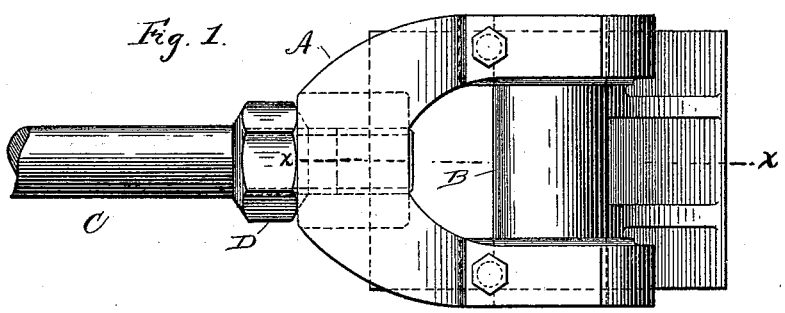
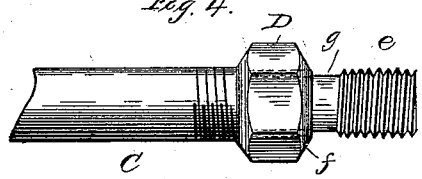
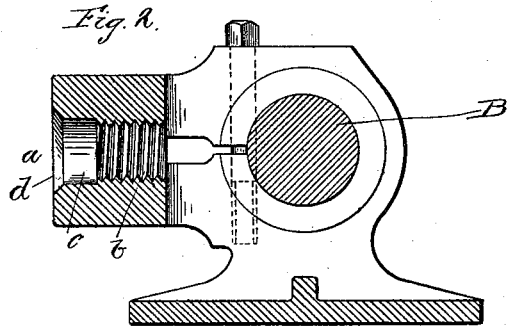
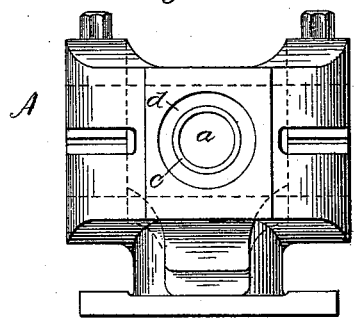
Witnesses
Victor J. Evans.
R. F. Heck.
Inventor
Edwin J. Armstrong
by W. A. Redmond
Attorney

# UNITED STATES PATENT OFFICE.

EDWIN J. ARMSTRONG, OF OSWEGO, NEW YORK, ASSIGNOR TO THE AMES IRON WORKS, OF SAME PLACE.

DEVICE FOR SECURING PISTON-RODS TO CROSS-HEADS.

SPECIFICATION forming part of Letters Patent No. 521,695, dated June 19, 1894.

Application filed February 12, 1894. Serial No. 499,888. (No model.)

*To all whom it may concern:*

Be it known that I, EDWIN J. ARMSTRONG, a citizen of the United States, residing at Oswego, in the county of Oswego and State of New York, have invented certain new and useful Improvements in Devices for Securing Piston-Rods to Cross-Heads; and I do hereby declare the following to be a full, clear, and exact description of the invention, such as will enable others skilled in the art to which it appertains to make and use the same.

This invention relates generally to crossheads for steam engines and particularly to devices or means for securing the piston rod to the cross-head, and it has for its object to provide simple means for securing the true alignment of the rod in the first instance and to maintain such alignment thereafter, and it consists in the parts and combinations of parts hereinafter described and claimed.

In the accompanying drawings forming a part of this specification, Figure 1 is a plan view of a cross-head and piston rod secured together by my improved means; Fig. 2 a vertical section on the line *x—x*, Fig. 1; Fig. 3 a front elevation of the cross-head; and Fig. 4 a detail view of one form of piston rod.

Similar letters refer to similar parts throughout the several views.

In the usual manner of securing a piston rod to a cross-head the cross-head is bored out and tapped and the rod screw-threaded and run therein, and secured by a jam nut, and no matter how great the care exercised in fitting the parts it is very difficult to secure accurate alignment in the first instance, for the reason that it is extremely difficult to cut a screw thread on the rod and bore and tap the crosshead so as to preserve the same pitch in both and cause the threads, when under strain, to bear equally from end to end of the thread. If they are in the least out of pitch a very few threads at one or the other end of the screw are caused to stand all the strain and their length is not sufficient to maintain or preserve the alignment. Besides with the usual manner of securing the rod and crosshead together there is no means provided for altering the alignment after the work is once done, even to the extent of correcting slight errors or inaccuracies of alignment. In fact experience has demonstrated that it is almost impossible to tighten up the jam nut on a rod in a cross-head of the ordinary construction twice in succession and secure exactly the same alignment of the rod both times, because of the difference in pitch of threads intended to be of exactly the same pitch throughout their lengths. These difficulties I overcome and secure the accurate alignment of the rod in the first instance and maintain or preserve, and, if necessary, alter the alignment of the rod without attempting to secure exactly the same pitch of the threads of the screws when cutting the same by the means hereinafter described.

In the drawings A represents a crosshead, B the crank pin, and C the piston rod of an engine. The crosshead is bored out as usual, as at *a*, and for a portion of the length of said opening I cut screw-threads *b* instead of threading or tapping it its whole length as is customary. The unthreaded portion of the opening, at its outer end, is enlarged, as at *c*, so that its diameter is greater than the diameter of the threaded portion of said opening and the mouth of the opening is beveled, as at *d*. The piston rod B is formed with screw-threads *e* at one end adapted to fit the threads *b* as accurately as possible and a jam nut D having a beveled face *f*, adapted to accurately fit the beveled mouth of the opening in the crosshead which forms a seat for said nut which is run on said rod.

In practice the rod is screwed into the crosshead and the jam nut tightened in order to secure it in place. In tightening the nut it draws central in its beveled seat and draws the rod central in the opening and, as the nut is located at some distance from the threads on the end of the rod, it is evident that if these two portions of the rod are true the whole rod is true and in line and that loosening and again tightening the rod has no effect to throw it out of line as the nut and the thread on the rod draws central each time. In first fitting the rod to the crosshead if any inaccuracies of alignment are found to exist it is only necessary to scrape the beveled seat or mouth of the opening of the crosshead slightly which in practice is found quite sufficient to correct slight errors in alignment, which the greatest care in boring and tapping the opening does not fully guard against, and to thus readily secure absolute accuracy in alignment of the rod.

The rod may be formed with a thread of the same length as the thread in the opening of the crosshead, as shown in Fig. 4, and with a reduced portion, as at $g$, unthreaded which lies, when the rod is in place in the unthreaded portion of the opening in the crosshead, and screw-threads are cut on the rod for the nut, but I do not desire to be limited to this construction as it is evident the rod may be of the same diameter throughout and the thread extended back to carry or receive the nut and the unthreaded portion of the opening in the crosshead formed with enlarged threads and the same result obtained. My preferred construction, however, is to thread the rod and leave blank or unthreaded a portion of the opening in the crosshead.

Having thus described my invention, what I claim as new, and desire to secure by Letters Patent, is—

1. The combination, with a cross head having an opening therethrough formed with screw-threads, a beveled mouth or seat at the end of said opening, and a blank or unthreaded portion intermediate said beveled mouth and the screw-threaded portion of the opening, of a piston rod having a screw-threaded end, and a nut having a beveled face adapted to fit the beveled mouth of the opening, substantially as described.

2. The combination with a cross head having a screw threaded opening therethrough of greater diameter for a portion of its length at one end than at the other, and with a beveled mouth or seat, of a screw-threaded piston rod adapted to fit the smaller diameter of the opening, and a nut having a beveled face adapted to fit the beveled mouth of the opening, substantially as described.

3. The combination, with a crosshead having an opening formed with a beveled seat or mouth, a portion of said opening being screw-threaded, of a piston rod having an unthreaded portion between two threaded portions at one end, and a nut having a beveled face adapted to fit said beveled seat, substantially as described.

4. The combination, with a cross head having an opening formed with screw-threads and a beveled mouth or seat, of a piston rod adapted to engage a section of said opening at one end thereof whereby a space is provided surrounding said rod within the opening adjacent its beveled mouth, and a jam nut adapted to fit into said beveled mouth or seat, substantially as described.

In testimony whereof I affix my signature in presence of two witnesses.

EDWIN J. ARMSTRONG.

Witnesses:
THEODORE H. HADLEY,
BERNARD GALLAGHER.